(12) United States Patent
Young

(10) Patent No.: X8989
(45) Date of Patent: Jul. 21, 1835

(54) FLOAT, ROTARY, SPIRAL SPRING, FOR STEAM ENGINE

(76) Inventor: Mason Young

Mason Young of the City of Buffalo & State of New York.
Letters Patent.
The Schedule refered to in these Letters Patent & making part of the
same containing a description in the words of the said Mason Young
himself of his improvement: In the spiral Spring float propelling
rotary Steam Engine.

To all To whom these present shall come: Mason Young of the city.
of Buffalo. County of Erie and State of New York Sends Greeting. Be it
remembered and known that I the said Mason Young have invented
a new and useful improvement not known or used before, in the making
or constructing of a certain Machine called "the Spiral Spring float pro
pelling: Rotary Steam Engine" which invention and the manner of
using it is as follows. This invention or improvement consists, in the
application of Steam, through a pipe to the outer rim or periphery of the wheel
in such manner as to strike the float or bucket hereafter described in a
forward direction by means of which the said float along with the wheel
is moved. On the wheels axis close behind the throat of the steam
pipe (within the shell or case made of cast iron or brass) is placed a
camb or apron screwed fast on the inner side of the shell, which
camb is made to fit closely and steam tight, to the wheel in order to
prevent the backward pressure of the Steam, and against which camb
the float is rising or falling, as soon as the float arrives near the throat
of the steam pipe (which rising or falling of said float depends on the
fact whether the steam is let on, over or under the outer circumfer-
ence of the wheel) by means of spiral Springs of wire, wound around
the stems of the floats. The floats are let into the outer rim of the
wheel (towards the centre of the wheel) by means of gains cut into
the wheel in which gains, the floats play in and out of the wheel.
The stems of the floats are made of wrought iron, turned out of squ-
are bars of iron, so as to leave a square bulb to confine the spiral
[illegible] towards the centre of the wheel and a collar or valve, between
the inner side of the rim, of the wheel and the end of the springs. The stems of the floats are screwed into the floats on the inner side and head-
-ed down after the hole (bored through the float) is counter sunk, on
the outer side of the float. To support the inner ends of the float stems
a concentrick wheel is perforated, to receive the inner ends of the float
stems, through which concentrick circle the arms of the wheel pass
(all being cast solid from the hub to the outer rim. Inside of the
shell, on each side of the hollow which is to receive the wheel, is
confined a brass box to crowd against the wheel, which boxes are
attached to stems, around which stems are wound wire springs, in
a spiral manner which stems are passed through the shell into
iron guards to sustain them, and valves or collars around the
stems on the outer side of the shell, to prevent the escape of steam,
One large escape pipe on each side of the shell or case, and one other
large escape pipe, just over the place where the steam leaves the
said brass boxes or camb) rising out of the shell in a vertical position.
The advantages the foregoing application of steam possesses, consists
in overcoming the friction occasioned by the old method of crank &
piston. Also obviating the difficulties arising from the dead centres
in the use of the crank and piston plan. By the invention or im-
-provement above mentioned, it is insisted that nearly all the lever
purchase of the wheel is secured. That the expense of construction
is greatly diminished, thereby bringing the steam engine into more
common use. Lastly a consideration more weighty than any other,
the saving of fuel, necessary in generating steam; by this new meth-
-od by which less steam performs more labour according to the given
diameter of the wheel in nearly an inverse ratio.

I claim therefore the application of the aforesaid
method of using steam, as well as the manner of constructing
the wheel with its appendages. the camb or eccentric used in
the shell, together with the manner of making the boxes with spiral
springs.

Witnesses
I. Clary. Roswell Chapin

Mason Young

Exd. W.G.C. (Patented 21st July 1835) (868 [illegible])